(12) United States Patent
Flournoy, Jr. et al.

(10) Patent No.: US 7,743,869 B2
(45) Date of Patent: Jun. 29, 2010

(54) MINING UTILITY TRANSPORT VEHICLE

(75) Inventors: Donald B. Flournoy, Jr., Muscle Shoals, AL (US); Floyd T. Patterson, Town Creek, AL (US); Michael J. Stumpe, Muscle Shoals, AL (US); John F. Bryerton, Florence, AL (US); Hilard R. Cantrell, Jr., Tuscumbia, AL (US); Timothy A. Ellett, Muscle Shoals, AL (US)

(73) Assignee: Listerhill Total Maintenance Center LLC, Muscle Shoals, AL (US)

( * ) Notice: Subject to any disclaimer, the term of this patent is extended or adjusted under 35 U.S.C. 154(b) by 460 days.

(21) Appl. No.: 11/789,792

(22) Filed: Apr. 25, 2007

(65) Prior Publication Data

US 2008/0106062 A1 May 8, 2008

Related U.S. Application Data

(60) Provisional application No. 60/794,740, filed on Apr. 25, 2006.

(51) Int. Cl.
*B62D 5/06* (2006.01)
*B62D 11/00* (2006.01)
(52) U.S. Cl. .................... 180/235; 180/418
(58) Field of Classification Search ........... 180/235, 180/418, 419, 420
See application file for complete search history.

(56) References Cited

U.S. PATENT DOCUMENTS

| | | | | |
|---|---|---|---|---|
| 2,833,557 A * | 5/1958 | Palmiter | .................... | 180/420 |
| 3,208,544 A * | 9/1965 | Colvin | ...................... | 180/8.3 |
| 3,357,513 A * | 12/1967 | Sundberg | .................... | 180/329 |
| 3,414,072 A * | 12/1968 | Hodges, Jr. et al. | .......... | 180/24 |
| 3,446,175 A * | 5/1969 | Boehler et al. | .............. | 180/121 |
| 4,202,453 A * | 5/1980 | Wilkes et al. | ............... | 212/290 |
| 4,212,365 A * | 7/1980 | Curry | ......................... | 180/420 |
| 4,809,805 A * | 3/1989 | Short | ......................... | 180/420 |
| 4,890,684 A * | 1/1990 | Simmons | ..................... | 180/419 |
| 5,533,587 A * | 7/1996 | Dow et al. | .................. | 180/235 |
| 5,873,431 A * | 2/1999 | Butler et al. | ................ | 180/418 |
| 6,016,885 A * | 1/2000 | Hickman et al. | ............ | 180/418 |
| 6,062,335 A * | 5/2000 | Renger et al. | ............... | 180/418 |
| 6,604,351 B2 * | 8/2003 | Dillon | ........................ | 56/14.6 |
| 2005/0039973 A1* | 2/2005 | Clark | ........................ | 180/418 |

* cited by examiner

*Primary Examiner*—Lesley Morris
*Assistant Examiner*—Marc A Scharich
(74) *Attorney, Agent, or Firm*—Whiteford, Taylor & Preston L.L.P.; Gregory M. Stone (57) ABSTRACT

A mine transport vehicle is disclosed having two main bodies, one a power and control section and the other a payload section, the two sections being connected by an articulating joint. The power and control section has seating for an operator and a passenger. The payload section has seating for four passengers as well as capacity for at least approximately 2000 pounds of equipment. The weight distribution of each section is such that the stress on the frame and articulating joint is minimized thus providing improved life of the joint.

13 Claims, 11 Drawing Sheets

MINING UTILITY TRANSPORT VEHICLE

CROSS REFERENCE TO RELATED APPLICATION

This application is based upon and claims benefit of copending U.S. Provisional Patent Application Ser. No. 60/794,740 entitled "Mining Utility Transport Vehicle", filed with the U.S. Patent and Trademark Office on Apr. 25, 2006 by the inventors herein, the specification of which is incorporated herein by reference.

BACKGROUND OF THE INVENTION

1. Field of the Invention

This invention generally relates to vehicles and, in particular, to a vehicle specifically designed for reliable transportation of personnel and equipment for the mining industry.

2. Background of the Prior Art

Operation of vehicles for the transportation of personnel and equipment in deep shaft mines poses problems unlike most other mining operations. The environment of operation includes rough and irregular terrain, poor visibility and clearances, typically rough treatment of equipment, long and often continuous hours of operation from shift to shift, poor availability of repair resources and skills while in the mine, and a rust/corrosion accelerated environment due in part to deep pools of salt and silted water in the mine road paths. Mechanical joints and rotating drive equipment are prone to failure due to these adverse conditions. Additionally, such mechanical joints and connections typically require routine lubrication that inherently attracts the very substances that promote failures. Other designs have attempted to overcome these obstacles but have either failed to do so or have created another failure point in the attempt.

There remains a need for a robust mine transportation vehicle designed for operation with simple, minimal controls that are easily located for operation and servicing. There also remains a need for a vehicle with an articulating joint, such that the front and rear vehicle sections are balanced so as to not transmit unnecessary additional stress on the articulating joint.

SUMMARY OF THE INVENTION

Disclosed is a vehicle sized and configured to make it suitable for transporting mining equipment and personnel for extended distances and durations with little or no significant downtime. Design criteria focus on elimination or reduction of lubricated joints, exposed rotating equipment, and complicated control systems. In a particularly preferred embodiment, the vehicle has two main bodies, one a power and control section and the other a payload section, the two sections being connected by an articulating joint. The power and control section preferably has seating for an operator and a passenger. The payload section preferably has seating for multiple passengers, preferably at least four passengers, as well as capacity for at least 2000 pounds of equipment. The weight distribution of each section is such that the stress on the frame and articulating joint is minimized, thus providing improved life of the joint.

It is desired to provide the mining industry with a vehicle for the transportation of personnel and equipment that can operate continuously with reduced maintenance based on scheduled minor servicing. A vehicle that is capable of meeting these criteria provides a significantly lower cost of operation and reduced loss of operation, thereby improving mine output capability by having workers at the needed locations immediately. Since operation of the vehicle includes traversing pools of salt and silted water, the design includes methods for self-bailing floors and protection of power and drive systems from submersion or exposure. Those components that could be exposed are constructed from materials that are resistant or minimally compromised by rust and corrosion.

In order to achieve the reduced service and reduced maintenance goals, the vehicle is designed so that most key drive train components are sealed and do not have exposed joints, shafts, linkages, or moving components. This includes the axle/differential system, the braking system, the drive motors, and the engine/pump power plant. The input to the pinion shaft of the differential is a sealed direct coupling to a hydraulic drive motor and brake device. The power section and the payload section are essentially identical in design with respect to the drive train, having no exposed moving power transmission parts. Power to the hydraulic motors on each section is provided through hydraulic lines from a control valve arrangement on the power section. Hydraulic power to the control valves is provided by a pump system directly coupled to a diesel engine. The control valves are piloted from a return-to-stop foot pedal and are based on a pre-set engine speed. No external drive shafts, universal joints, shaft bearings, transmission, or clutch type equipment exists for fouling and failure. The overall structural design includes materials that are either substantial in size or of special materials such that they are not compromised by impacts or deterioration due to harsh environmental elements. The drawings provide a general view of the vehicle as well as component locations and arrangements.

An additional feature of the invention is an articulated joint for connecting the power section and payload section together that allows each section to move rotationally about vertical and horizontal axes. Very high stresses occur in the area of the articulated joint due to the environmental conditions of the mine and rough terrain. Materials designed in the articulated joint preferably include hardened pins, an aluminum/bronze graphite impregnated bushing, high impact non-corrosive liner material, and a hardened backer plate for minimal wear of the rotational device. Furthermore, the stresses on each end of the joint are minimized through the balance of each connected car to improve life of the articulated joint. The joint is designed such that in case of failure, it can be removed and another unit bolted in place.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE INVENTION

The invention summarized above may be better understood by referring to the following description, which should be read in conjunction with the accompanying drawings in which like reference numbers are used for like parts. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Referring now to the drawings, FIGS. 1-4 show a vehicle, indicated generally as 10, according to the present invention. The vehicle 10 comprises a power and control section 13 and a payload section 15. The power and control section 13 comprises an engine compartment 18 for a continuous service diesel engine 19 (FIG. 11) having a large capacity fuel tank 21. Driver seating 24 and passenger seating 25 is provided in the power and control section 13. A canopy 28 having a windshield 29 and open sides for access protects the driver seat 24 and passenger seat 25. The payload section 15 includes four additional passenger seats 31, 32, 33, 34 and a cargo bay 37 that can carry up to 2000 pounds of payload. A rear canopy 40 having a windshield 41 and open sides for access protects the passenger area of the payload section 15.

The power and control section 13 is connected to the payload section 15 by a sealed greaseless articulating joint 45 that allows lateral and rotational movement between the two sections 13, 15. The articulating joint 45 is designed to be replaceable as a unit. Rotational plates 48 are made from non-corrosive, non-lubricated material. Pivot hinges 49 utilize aluminum-bronze bushings with impregnated graphite. Bump stops 51, 52 are provided on the angled rear portion of the power and control section 13 to cushion the extremity of the range of travel when the vehicle 10 is pivoted.

Figure 1:
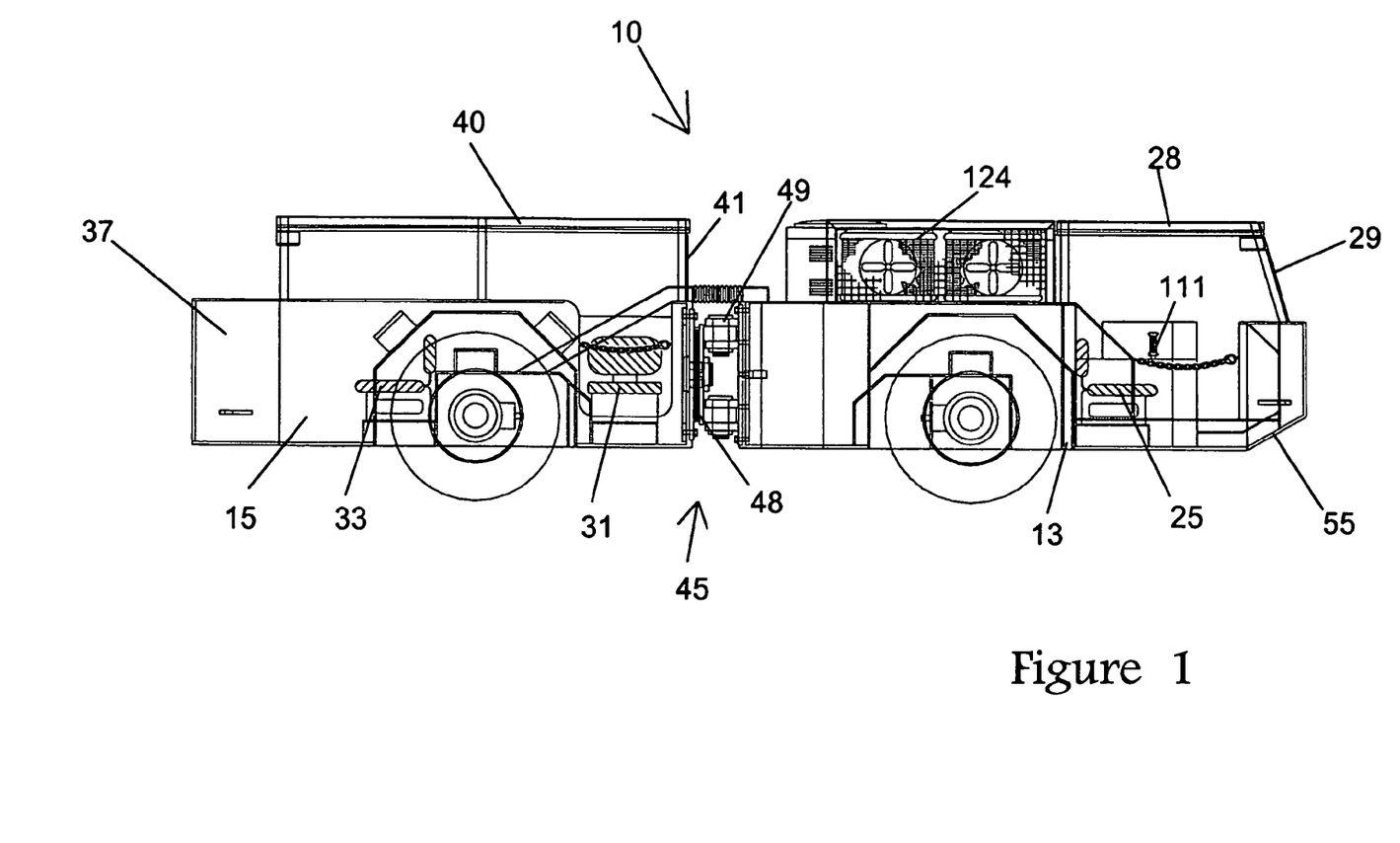
FIG. 1 shows a side elevational view of a mining utility transport vehicle according to a first preferred embodiment of the present invention.
Figure 2:
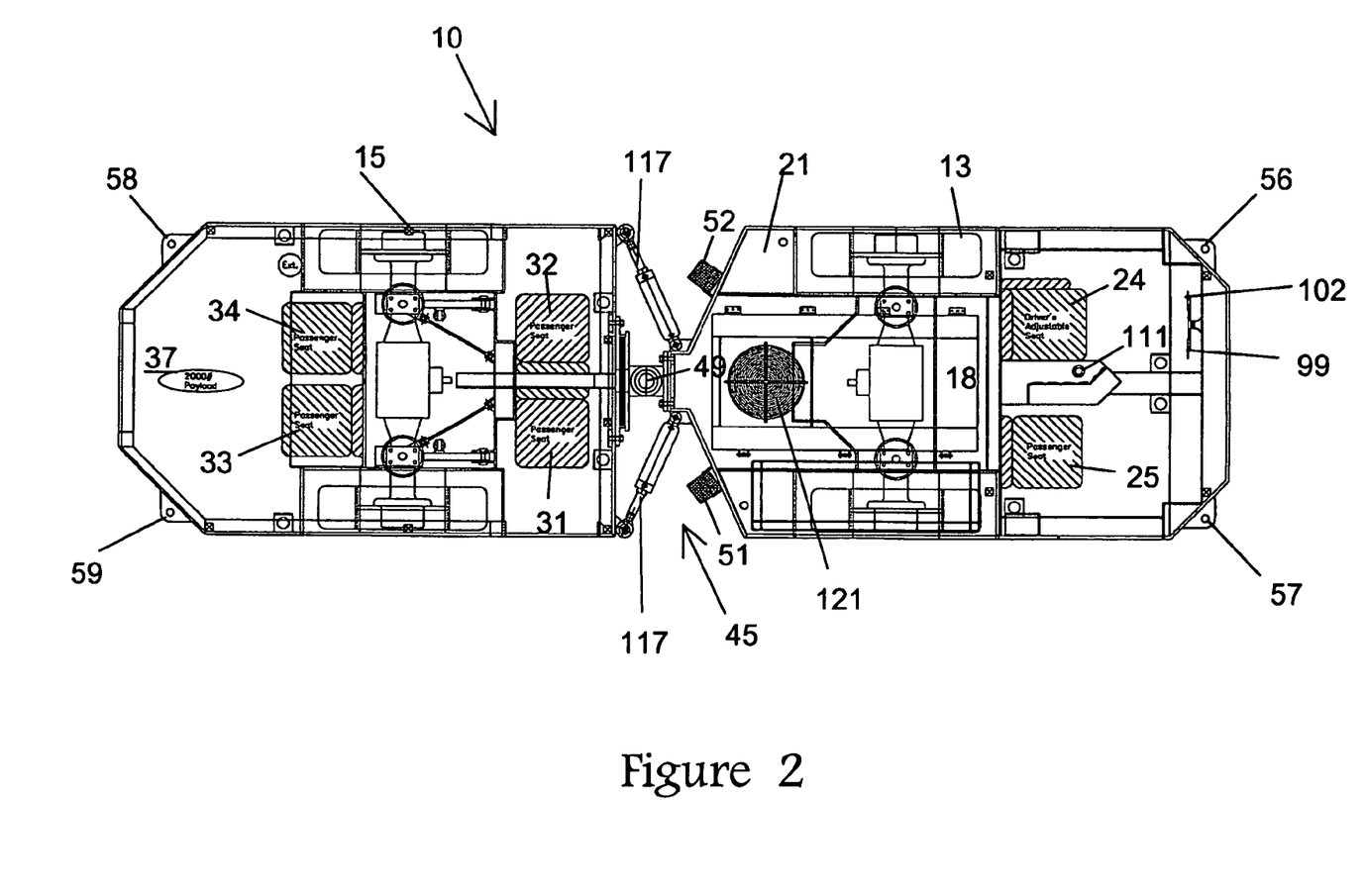
FIG. 2 shows a top plan view of the mining utility transport vehicle of FIG. 1.
Figure 3:
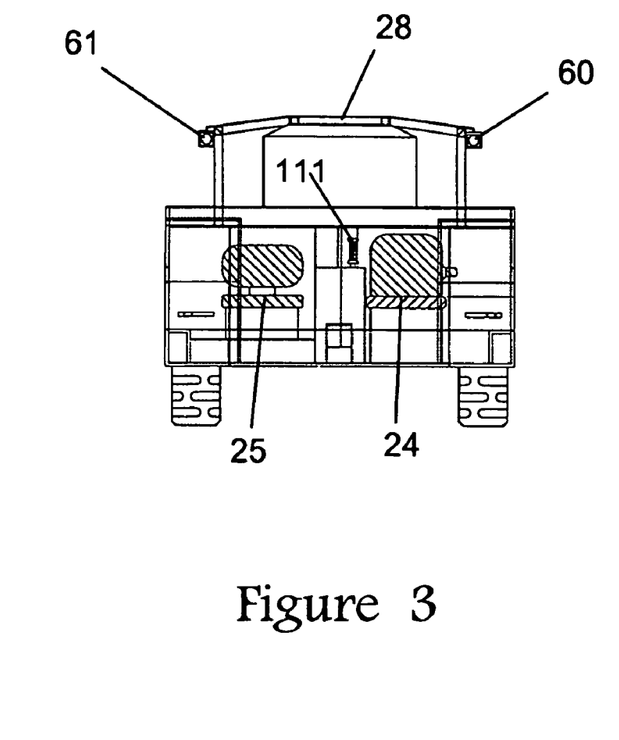
FIG. 3 shows a front elevational view of the mining utility transport vehicle of FIG. 1.
Figure 4:
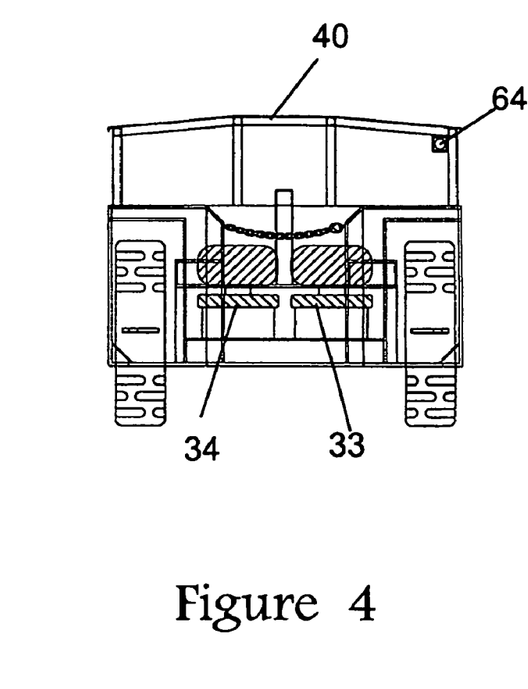
FIG. 4 shows a rear elevational view of the mining utility transport vehicle of FIG. 1.
Figure 5:
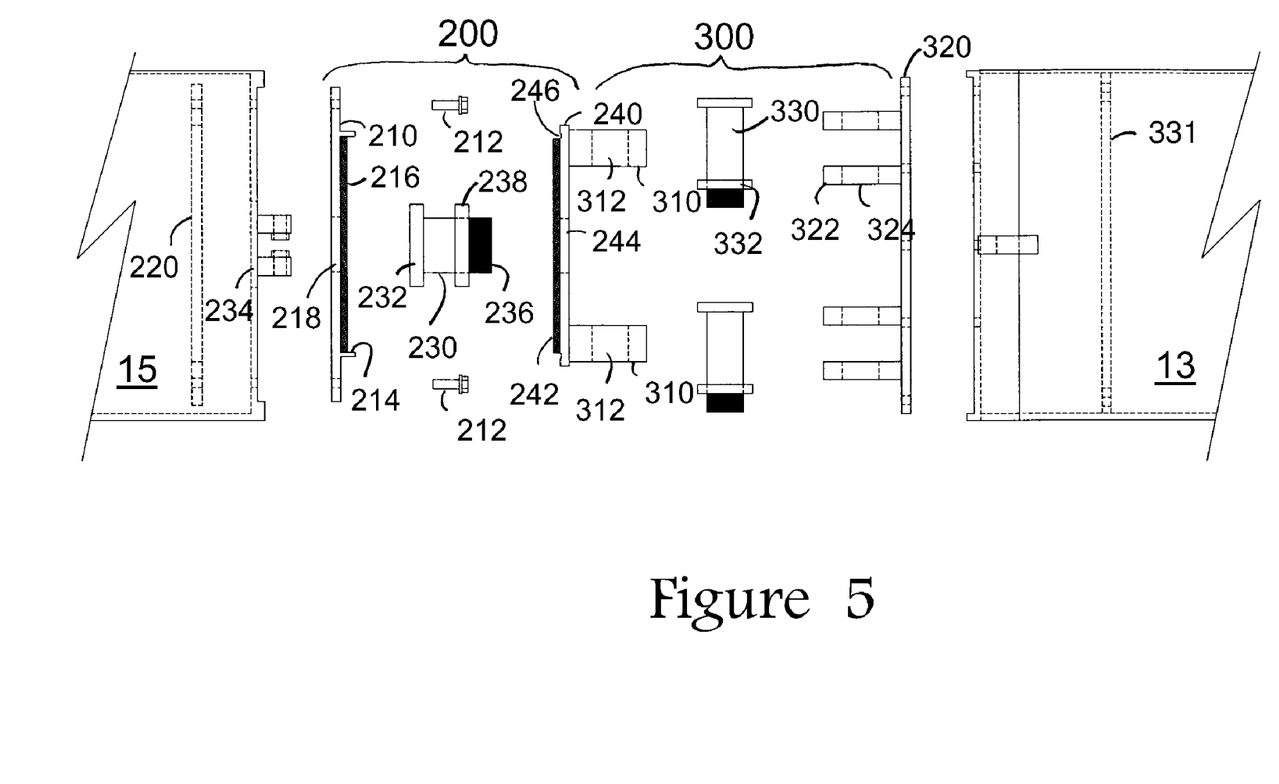
FIG. 5 shows an exploded view of an articulating joint according to a particularly preferred embodiment of the invention.
Figure 6:
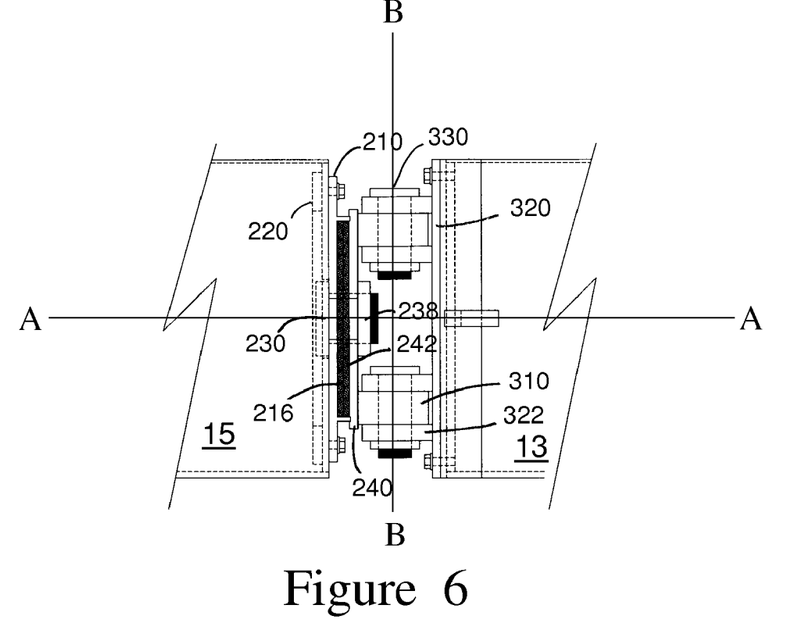
FIG. 6 shows an assembled, partial sectional view of the articulating joint of FIG. 5.
Figure 7:
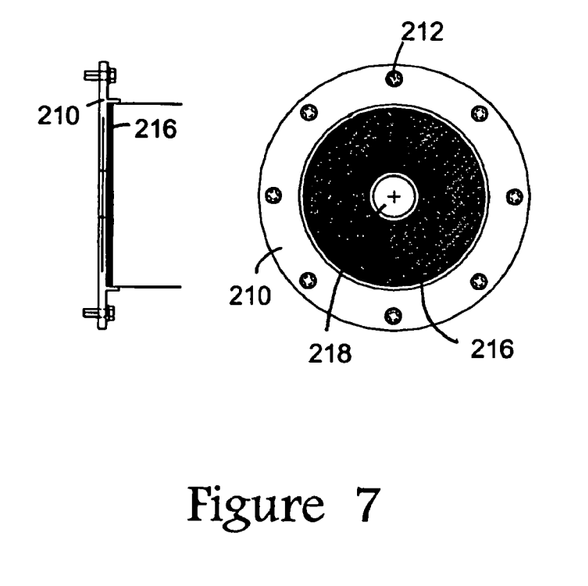
FIG. 7 shows a detail view of a composite disc bearing for use with the articulating joint of FIG. 5.
Figure 8:
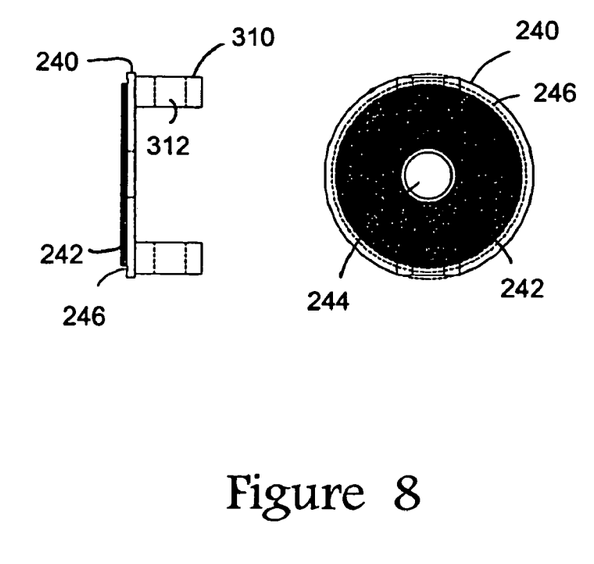
FIG. 8 shows a detail view of a wear surface for use with the articulating joint of FIG. 5.

As shown more particularly in the exploded view of FIG. 5 and the close-up assembled view of FIG. 6, articulating joint 45 comprises a first subassembly 200 configured to allow rotational movement about a generally horizontal axis A-A between power and control section 13 and payload section 15, and a second subassembly 300 configured to allow rotational movement about a generally vertical axis B-B between power and control section 13 and payload section 15. First subassembly 200 includes a bearing surface support plate 210 that is bolted to a backing plate 220 on the interior of payload section 15 via bolts 212. A support hub 230 has a base 232 which is positioned in a recess 234 on the front wall of payload section 15, and a threaded end 236 opposite the base 232 configured to receive a threaded clamp ring 238. Bearing surface support plate 210 has a circular recess 214 configured to receive a composite disc bearing 216, preferably a composite disc bearing having a blend of carbon fiber for reinforcement and polymer as a binder, such as the composite disc bearings that are readily commercially available from HyComp Inc. under the trademarks WEARCOMP and FIBRECOMP. As particularly shown in the detail view of FIG. 7, both support plate 210 and composite disc bearing 216 have a central opening 218 extending therethrough and sized to receive support hub 230. A wear surface support plate 240 holding a wear surface 242 (preferably a 4140 steel circular plate having a 16-32 RA finish) is situated in facing orientation to the bearing surface support plate 210 and composite disc bearing 216. Wear surface 242 is sized to fit within recess 214 of bearing surface support plate 210. As particularly shown in the detail view of FIG. 8, both wear surface support plate 240 and wear surface 242 have a central opening 244 extending therethrough and sized to receive support hub 230. Clamp ring 238 is threaded onto the end of support hub 230 to position composite disc bearing 216 against wear surface 242 while allowing relative rotation between the two. Preferably, wear surface support plate has a circular notch 246 circumscribing wear surface 242 and configured to receive the outer wall of circular recess 214. This configuration closes composite disc bearing 216 and wear surface 242 within an essentially closed chamber defined by the walls of recess 214 and the front face of wear surface support plate 240, thus shielding the bearing assembly from harsh environmental elements.

Attached to the back of wear surface support plate 240 are hinge members 310, each having a generally vertical, cylindrical opening 312 extending therethrough. A hinge bracket support plate 320 is bolted to a hinge bracket backer plate 331 by preferably bolting the two together through a back wall of power and control section 13. Hinge bracket support plate 320 is provided hinge brackets 322, each of which has a generally vertical, cylindrical opening 324 extending therethrough (and having a diameter equal to that of openings 312 in hinge members 310). A hinge pin 330 pivotally attaches each hinge member to a respective pair of hinge brackets 322, and a locking ring 332 holds each resulting hinge connection in place. This configuration thus allows pivoting of power and control section 13 about a generally vertical axis B-B extending through hinge pins 330 with respect to payload section 15.

The vehicle 10 of the present invention has four-wheel drive, and is designed to operate around-the-clock. It is designed to carry up to six passengers and 2000 pounds of cargo and equipment. Additional features of the vehicle 10 include a plasma cut plate steel frame with welded construction having balanced weight distribution over the axles. The lower portion 55 of the front of the power and control section 13 is sloped to serve as a skid plate. The power and control section 13 and payload section 15 may also be equipped with tow hooks, such as shown at 56, 57, 58, 59. Furthermore, the power and control section 13 may include front driving headlights 60, 61, and the payload section 15 may include a backup light 64.

Figure 9:
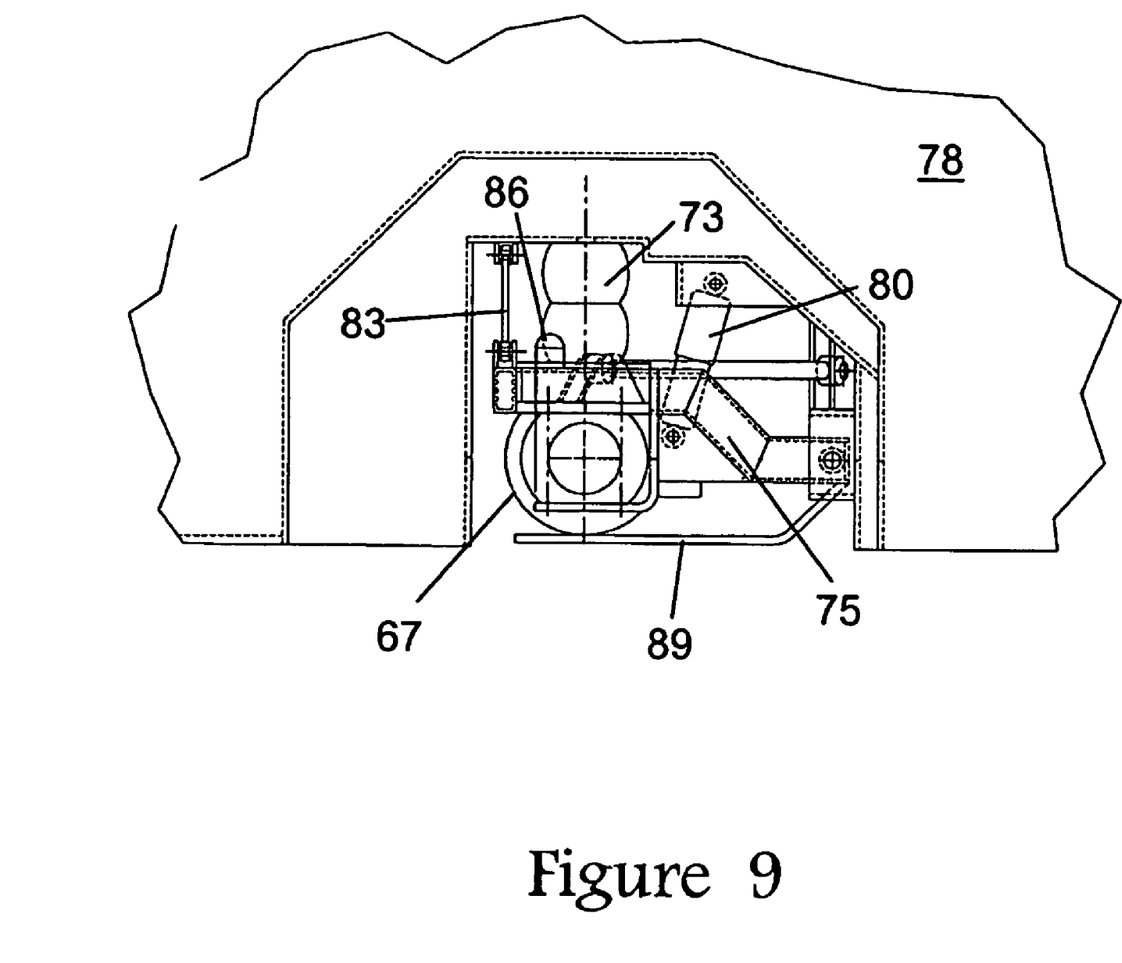
FIGS. 9 and 10 show a close-up side view of a vehicle suspension according to a particularly preferred embodiment of the present invention.
Figure 10:
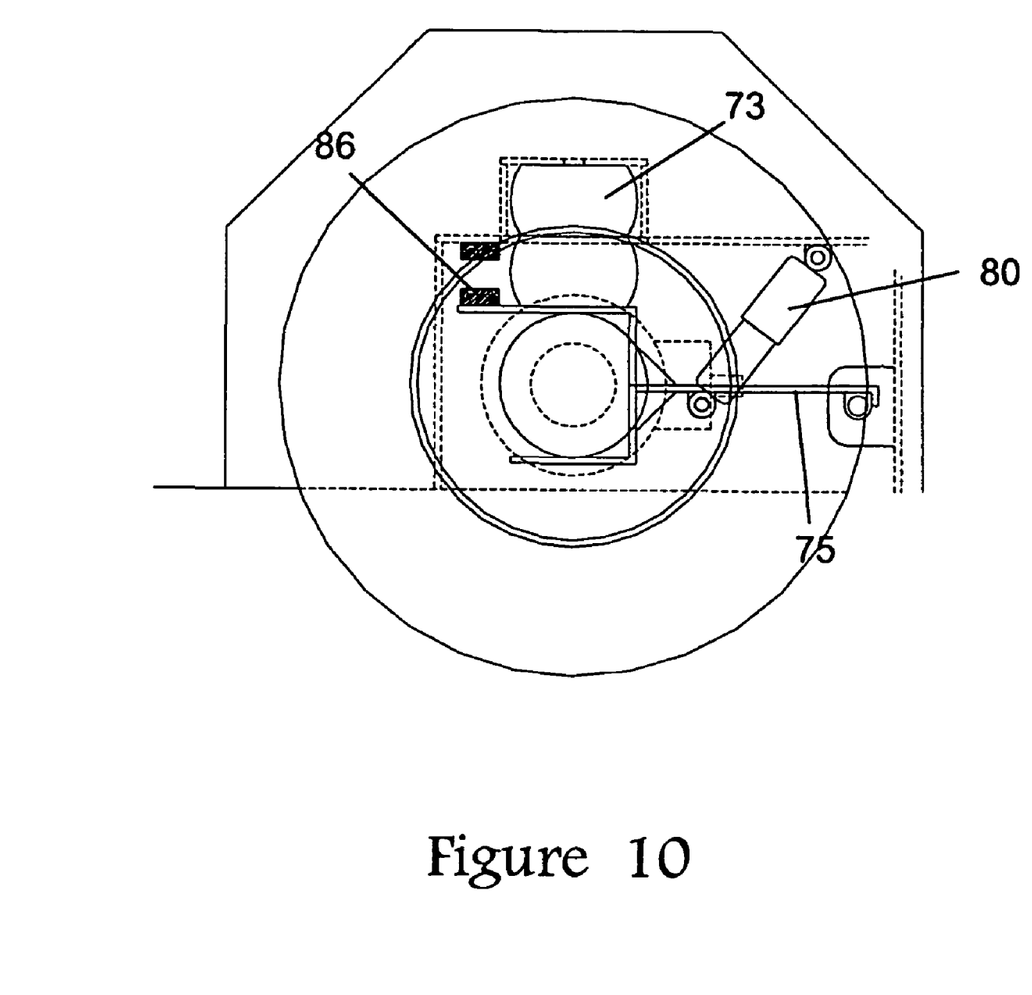

Referring to FIGS. 9 and 10, the vehicle 10 has air-ride suspension and shock dampening with approximately four inches of travel. The suspension shown in FIGS. 9 and 10 includes a Caterpillar axle unit 67 with an input shaft directly coupled to a hydraulic motor 70. An air bag 73 is installed over the axle 67. The leading arm 75 attaches the axle 67 to the body 78 of the power and control section 13 or payload section 15. A shock absorber 80 is attached between the far side of the leading arm 75 and the body 78. A tracking arm 83 with spherical bearings is also attached. A bump stop 86 limits vertical travel to approximately four inches. The axle configuration may also include a skid plate 89 to protect the axle unit 67.

Figure 11:
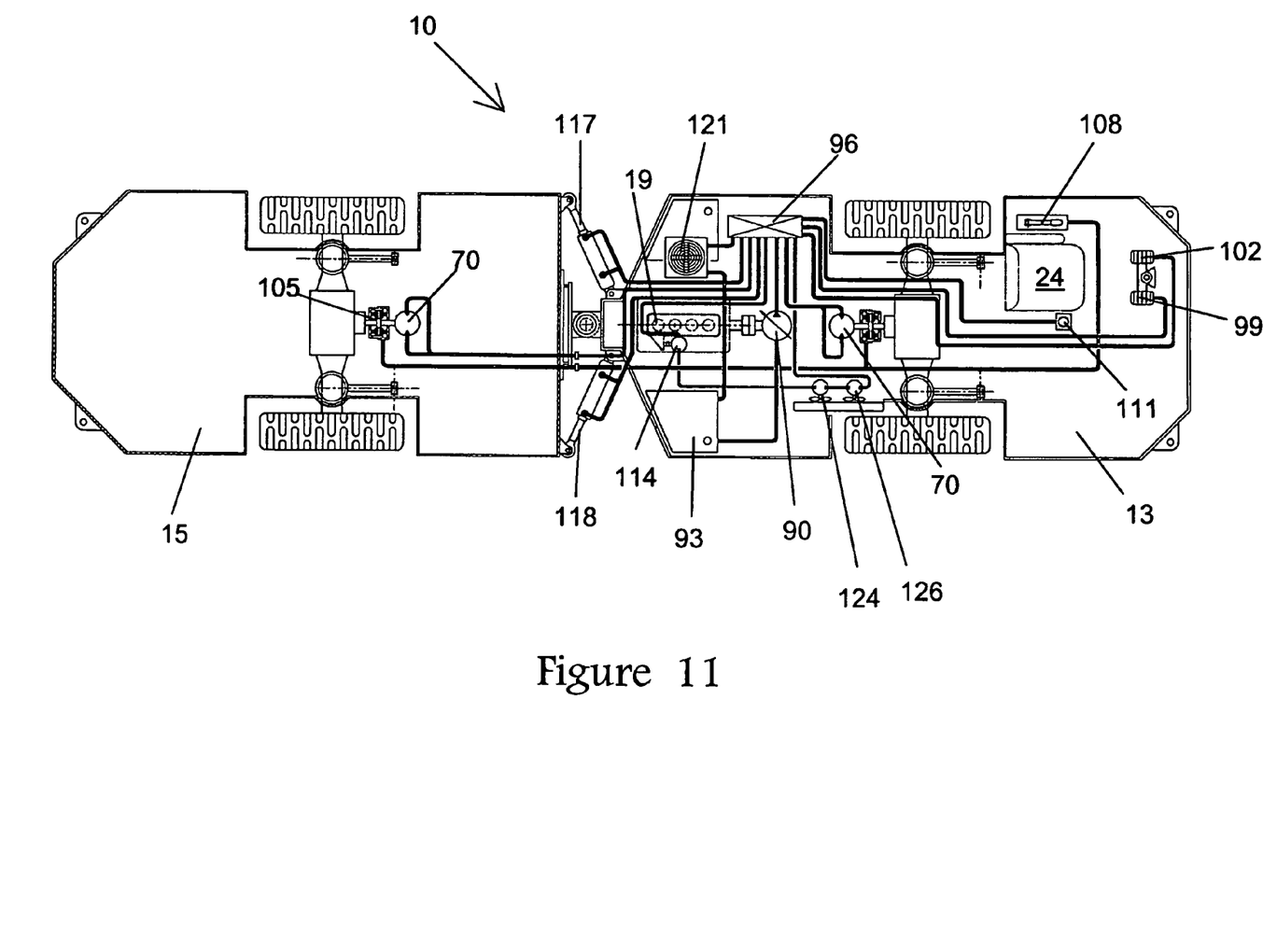
FIG. 11 shows a plan view of the undercarriage and hydraulics for the mining utility transport vehicle of FIG. 1.

The vehicle engine/drive train and motion control is provided by hydraulics as shown in FIG. 11. The power system is designed for long engine life at constant 2000-RPM operation. A variable displacement hydraulic pump 90 is coupled directly to the diesel engine 19. Hydraulic fluid is taken from storage tank 93 and directed under pressure to control valves 96. The hydraulic motor 70 on the front and rear axle provides rotational motion for the four wheels. A floor mounted single foot pedal in front of the driver seat 24 provides for an accelerator 99 to control the speed of the vehicle 10 and a brake 102. For braking, a sealed hydraulic brake unit 105 is coupled directly to the hydraulic motor 70. A parking brake 105 with emergency override 108 may also be provided. There are no mechanical powertrain components exposed to the environment.

Figure 12:
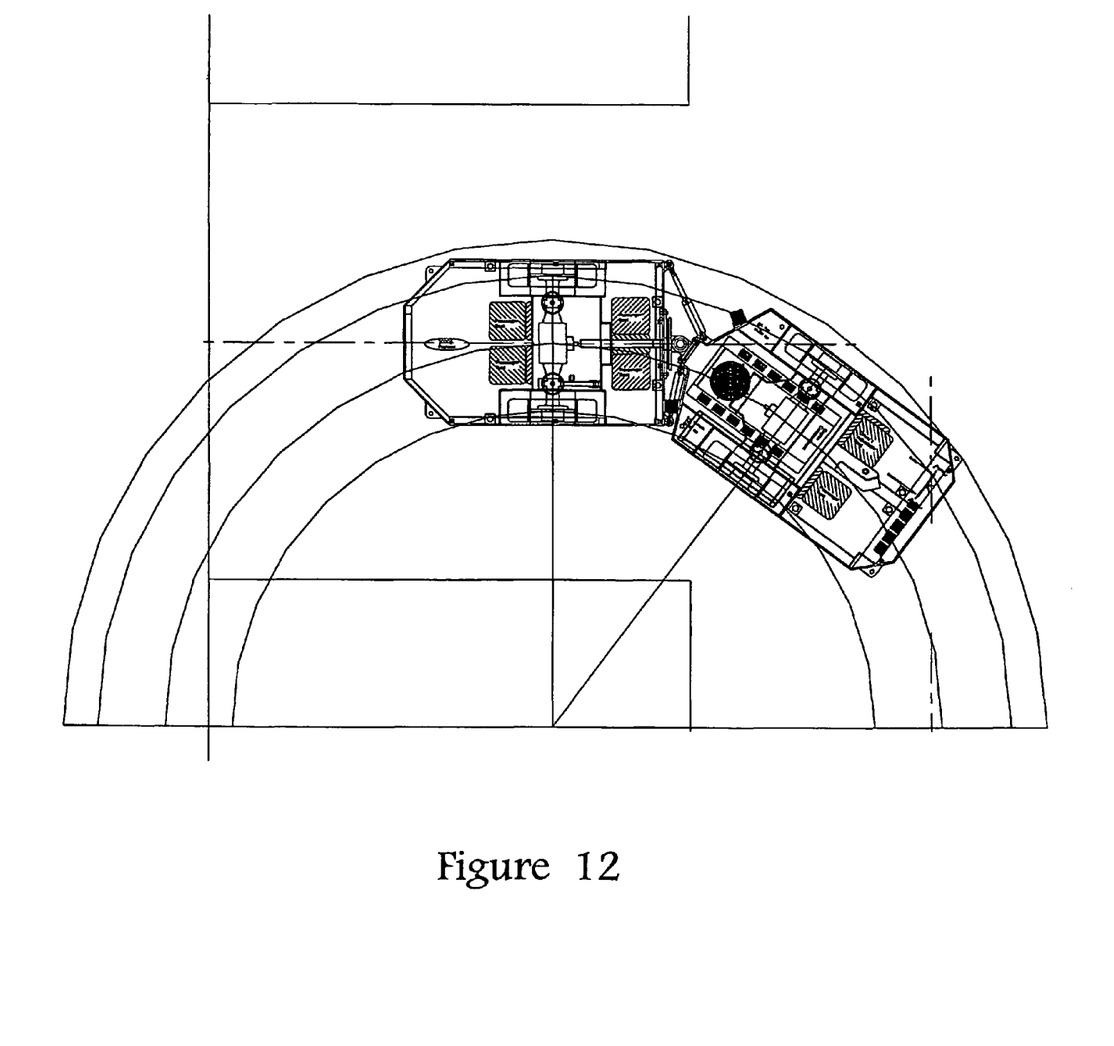
FIG. 12 shows an illustration of an exemplary turning radius for the mining utility transport vehicle of FIG. 1.
Figure 13:
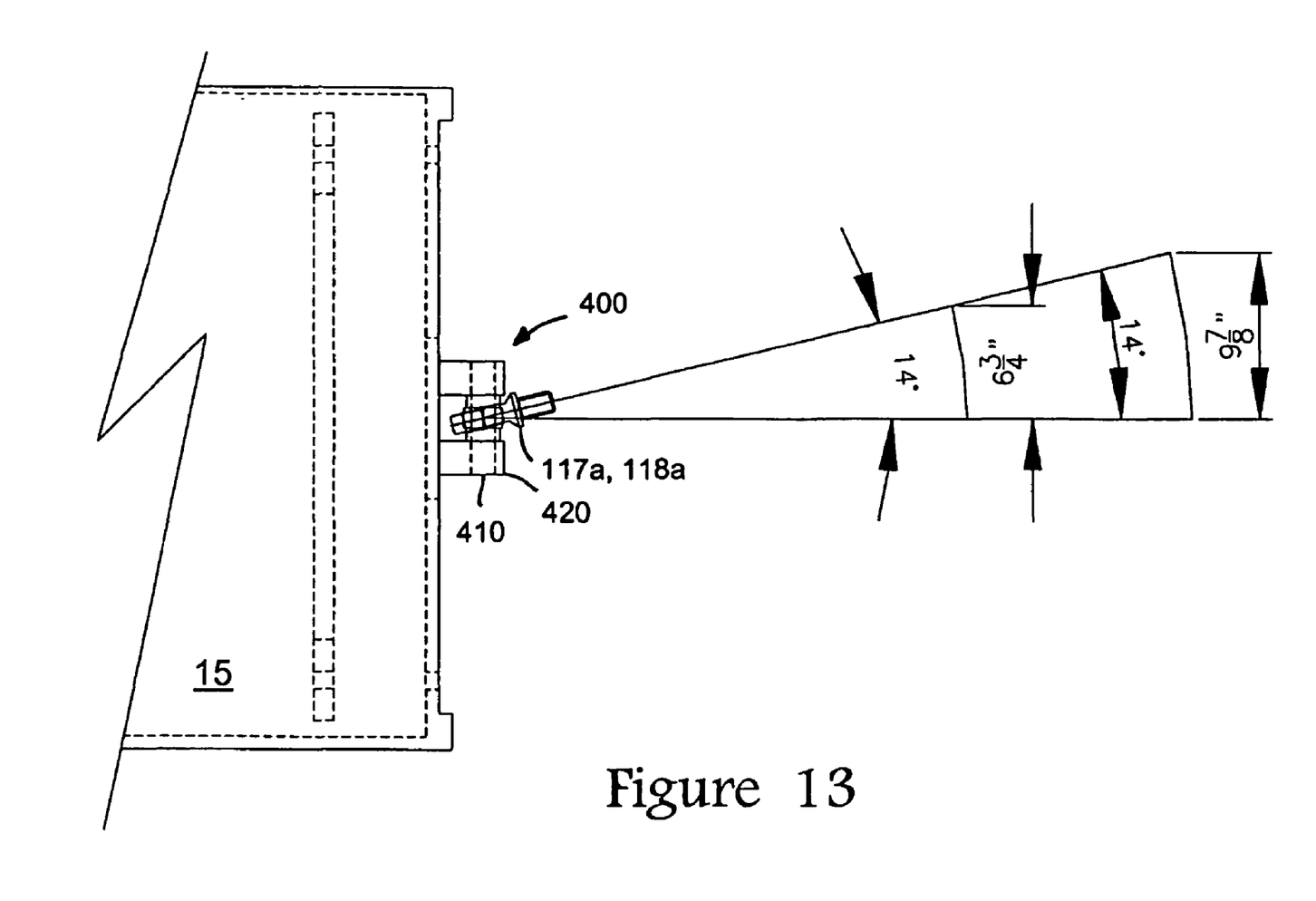
FIG. 13 shows a close-up view of a mounting assembly for a steering cylinder for use with the mining utility transport vehicle of FIG. 1.

Motion control is provided by a joystick-operated hydraulic steering system. Joystick 111 is centrally mounted adjacent to the driver seat 24. Gauge and control instrumentation is provided in a sealed console. A separate steering/auxiliary system hydraulic pump 114 is mounted directly to engine 19. Hydraulic steering cylinders 117, 118 are connected between the power and control section 13 and payload section 15. The hydraulic steering cylinders 117, 118 are extended or contracted to pivot the vehicle 10 around the articulating joint 45 to provide turning. FIG. 12 illustrates the minimum turning radius for a right hand turn. As particularly shown in FIG. 13, hydraulic steering cylinders 117, 118 are preferably attached to payload section 15 using a universal-type joint 400. Joint 400 mounts heads 117a, 118a of steering cylinders 117, 118 to payload section 15 so as to allow rotation about a vertical pin 410 extending through joint housing 420, and likewise so as to allow rotation in a generally vertical direction, thus accommodating rotation of payload section 15 with respect to power and control section 13.

Additional features include a heat exchanger 121 for the hydraulic fluid and an engine cooling system 124 that uses hydraulic powered cooling fans 126. All hydraulics are transferred through flexible lines and protected by the vehicle chassis or guarded in chases and sleeves. The hydraulic valves are pilot operated resulting in minimal electronic controls.

Some of the preferred service features of a vehicle configured in accordance with a particularly preferred embodiment of the invention include:

Elevated charge-air, engine and hydraulic cooler for less fouling and easier cleaning;

Electric circuits raised, sealed, and protected with waterproof through-wall connectors;

Fully enclosed engine compartment with elevated, easy access ECM;

Elevated oil and air filter service area;

Elevated hydraulic valve bank area; and

Tank-in-tank design for fuel tank and hydraulic tank.

It will be appreciated by persons skilled in the art that numerous variations and/or modifications may be made to the invention as shown in the specific embodiments without departing from the spirit or scope of the invention as broadly described. Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein. The present embodiments are, therefore, to be considered in all respects as illustrative and not restrictive.

We claim:

1. A mine car comprising:
a power and control section;
a payload section;
an articulating joint attaching said power and control section to said payload section, said articulating joint further comprising a first subassembly allowing rotational movement of said power and control section with respect to said payload section about a generally horizontal axis, and a second subassembly allowing rotational movement of said power and control section with respect to said payload section about a generally vertical axis, wherein said first subassembly further comprises:
a bearing surface support plate affixed to said payload section;
a composite disc bearing positioned on said bearing surface support plate;
a wear surface support plate having a front side facing said bearing surface support plate and said composite disc bearing, and said wear surface support plate having a back side connected to said second subassembly; and
a wear surface positioned on said wear surface support plate and facing said bearing surface support plate and said composite disc bearing;
wherein said bearing surface support plate is joined to said wear surface support plate so as to allow relative rotation between said bearing surface support plate and said wear surface support plate; and
a drive train comprising drive train components, wherein said drive train components are sealed within said mine car to substantially prevent contamination of said drive train components from an environment in which said mine car is operated.

2. The mine car of claim 1, further comprising a hydraulic motor, and said drive train further comprising a drive unit on at least one of said power and control section and said payload section, said drive unit further comprising an axle unit having an input shaft directly coupled to said hydraulic motor.

3. The mine car of claim 2, wherein each of said power and control section and said payload section are provided with a drive unit, and each of said power and control section and said payload section have balanced weight distribution over each axle unit of each drive unit.

4. The mine car of claim 2, further comprising:
a hydraulic fluid storage tank; and
a variable displacement hydraulic pump coupled to a diesel engine, said pump being configured to direct hydraulic fluid under pressure from said storage tank to one or more control valves, wherein said one or more control valves are configured to direct hydraulic fluid to at least said hydraulic motor.

5. The mine car of claim 4, wherein said control valves are piloted from a return-to-stop-pedal in a driver compartment in said power and control section.

6. The mine car of claim 2, further comprising a sealed hydraulic brake unit coupled to said hydraulic motor.

7. The mine car of claim 2, further comprising at least one hydraulic steering cylinder connected between said power and control section and said payload section.

8. The mine car of claim 7, wherein said steering cylinder is connected to at least one of said power and control section and said payload section by a universal joint.

9. The mine car of claim 1, wherein said composite disc bearing and said wear surface are enclosed within a closed chamber defined by contacting surfaces on each of said bearing surface support plate and said wear surface support plate.

10. The mine car of claim 1, said second subassembly further comprising:
    a hinge bracket support plate affixed to said power and control section, said hinge bracket support plate having at least one hinge bracket; and
    at least one hinge member connected to said first subassembly and pivotally attached to said hinge bracket.

11. A mine car comprising:
    a drive section;
    a payload section; and
    an articulating joint attaching said drive section to said payload section, said articulating joint further comprising:
        a first subassembly allowing rotational movement of said drive section with respect to said payload section about a generally horizontal axis;
        a second subassembly allowing rotational movement of said drive section with respect to said payload section about a generally vertical axis; and
        wherein said first subassembly further comprises:
        a bearing surface support plate affixed to said payload section;
        a composite disc bearing positioned on said bearing surface support plate;
        a wear surface support plate having a front side facing said bearing surface support plate and said composite disc bearing, and said wear surface support plate having a back side connected to said second subassembly; and
        a wear surface positioned on said wear surface support plate and facing said bearing surface support plate and said composite disc bearing; and
        wherein said bearing surface support plate is joined to said wear surface support plate so as to allow relative rotation between said bearing surface support plate and said wear surface support plate.

12. The mine car of claim 11, wherein said composite disc bearing and said wear surface are enclosed within a closed chamber defined by contacting surfaces on each of said bearing surface support plate and said wear surface support plate.

13. The mine car of claim 11, said second subassembly further comprising:
    a hinge bracket support plate affixed to said drive section, said hinge bracket support plate having at least one hinge bracket; and
    at least one hinge member connected to said first subassembly and pivotally attached to said hinge bracket.

* * * * *